United States Patent
Poisner

(10) Patent No.: US 6,920,553 B1
(45) Date of Patent: Jul. 19, 2005

(54) METHOD AND APPARATUS FOR READING INITIAL BOOT INSTRUCTIONS FROM A BOOTABLE DEVICE CONNECTED TO THE USB PORT OF A COMPUTER SYSTEM

(75) Inventor: David I. Poisner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/560,858

(22) Filed: Apr. 28, 2000

(51) Int. Cl.[7] ............................................. G06F 9/00
(52) U.S. Cl. ................................................ 713/2; 713/1
(58) Field of Search .......................... 713/1, 2, 100; 710/15, 62, 64, 73, 8

(56) References Cited

U.S. PATENT DOCUMENTS

| | | | | |
|---|---|---|---|---|
| 5,325,529 A | * | 6/1994 | Brown et al. ............... | 709/222 |
| 5,680,556 A | * | 10/1997 | Begun et al. ............... | 710/315 |
| 5,694,600 A | * | 12/1997 | Khenson et al. ............ | 713/2 |
| 5,805,882 A | * | 9/1998 | Cooper et al. .............. | 713/2 |
| 5,854,905 A | * | 12/1998 | Garney ...................... | 710/104 |
| 6,263,381 B1 | * | 7/2001 | Freadman .................... | 710/8 |
| 6,317,828 B1 | * | 11/2001 | Nunn ........................ | 713/2 |
| 6,366,583 B2 | * | 4/2002 | Rowett et al. ............. | 370/401 |
| 6,480,914 B1 | * | 11/2002 | Hsieh ....................... | 710/73 |

FOREIGN PATENT DOCUMENTS

| | | | | |
|---|---|---|---|---|
| JP | 04205627 A | * | 7/1992 | ........... G06F/9/445 |

OTHER PUBLICATIONS

"User Selectable Boot Process", IBM Technical Disclosure Bulletin, Jan. 1, 1995, US, pp. 377–378.*

* cited by examiner

Primary Examiner—Lynne H. Browne
Assistant Examiner—Paul Yanchus, III
(74) Attorney, Agent, or Firm—Fish & Richardson P.C.

(57) ABSTRACT

In one embodiment, a design is described for providing the BIOS instructions to a computer through the USB port. At boot-up, a USB controller checks the USB port for a bootable device containing BIOS instructions. If a bootable device is connected, the USB controller transfers the BIOS instructions through the USB port to the processor. The computer then boots-up using the USB boot instructions. If no bootable device is connected to the USB port, the computer looks to a standard BIOS EPROM for boot instructions.

19 Claims, 3 Drawing Sheets

METHOD AND APPARATUS FOR READING INITIAL BOOT INSTRUCTIONS FROM A BOOTABLE DEVICE CONNECTED TO THE USB PORT OF A COMPUTER SYSTEM

TECHNICAL FIELD

This invention relates to computer booting instructions, and more particularly to providing the BIOS instructions through a USB bus.

BACKGROUND

The BIOS (basic input/output system) is built-in software that determines what a computer can do without accessing programs from a disk. On PCs, the BIOS contains all the code required to control the keyboard, display screen, disk drives, serial communications, and a number of other functions. The BIOS is typically placed on a writeable chip that comes on the motherboard. This ensures that the BIOS will always be available and will not be damaged by disk failures. The BIOS also contains a boot program that provides the initial instructions to the computer processor at startup. These initial instructions contained in the boot program allow the computer to boot itself.

FIG. 1 illustrates the boot path 100 of a typical computer according to the prior art. The boot path includes a central processing unit (CPU) 105, a chipset 110, and a BIOS EPROM (erasable programmable read-only memory) 125. When a computer is first powered on, an initial set of instructions must be executed to allow the computer to boot itself. The CPU 105 is set to execute instructions that are located at the top of the computers memory located within the chipset 110. At power-up, there are typically no instructions present at these locations. Thus, the computer cycles forward to the BIOS EPROM 125. The BIOS EPROM 125 contains an initial set of boot instructions which are transferred to the chipset 110. The CPU 105 then reads the boot instructions from the chipset 110 and executed the instructions to boot the computer.

If the BIOS EPROM 125 is corrupted or missing, the initial set of boot instructions cannot be executed by the CPU 105. Thus, the CPU 105 is unable to boot the computer. In this circumstance, some computers allow the system to boot from the peripheral component interconnect (PCI) adapter. To accomplish this, hardware having a PCI interface is connected to the PCI bus. Because connections to the PCI bus are located on the computers motherboard, this procedure requires opening the housing of the computer.

If the BIOS does not exist or has been corrupted, existing systems allow the processor to boot from a peripheral component interconnect (PCI) adapter. This requires a user to open the housing of the computer to access the PCI adapter. It is typically undesirable to have a user open the housing of a computer. Even with trained service personnel, it would be more convenient to boot the computer without accessing the PCI adapter. This is especially true with systems having cases that are sealed or difficult to open, such as notebook computers.

DESCRIPTION OF DRAWINGS

Features and advantages of the invention will become more apparent upon reading the following detailed description and upon reference to the accompanying drawings.

DETAILED DESCRIPTION

Figure 1:
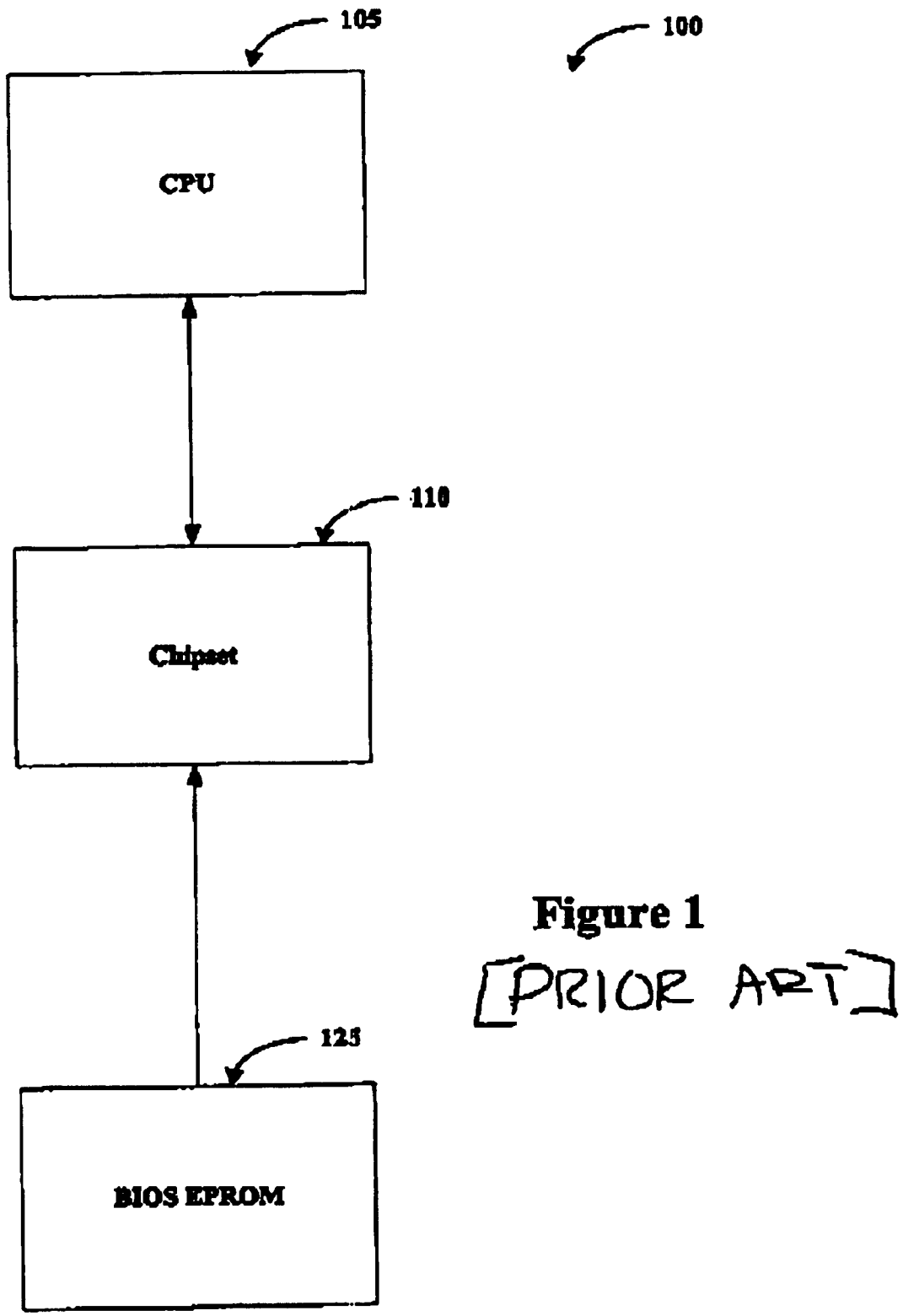
FIG. 1 illustrates the boot path of a computer according to the prior art.
Figure 2:
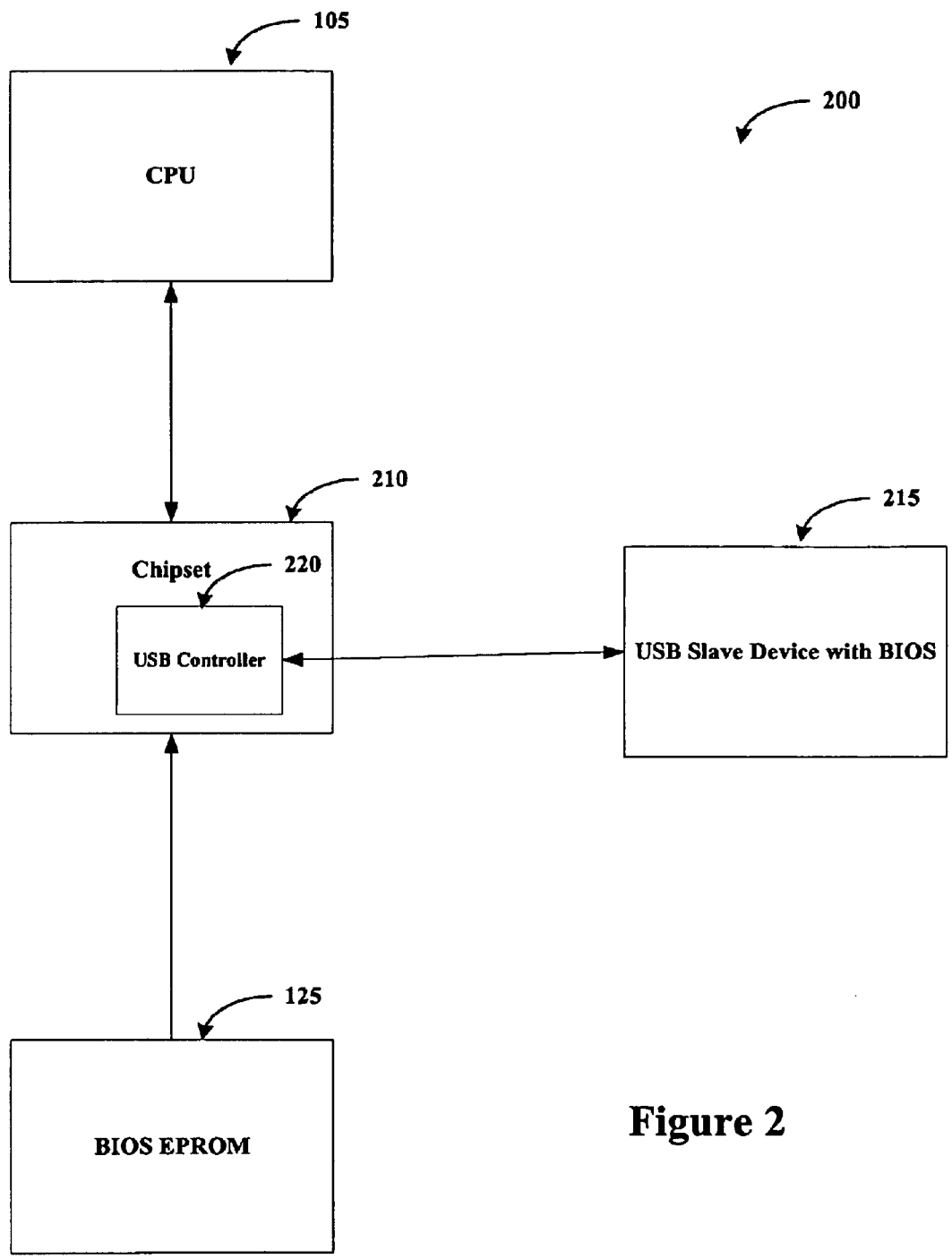
FIG. 2 illustrates the boot path of a computer according to one embodiment of the present invention.

FIG. 2 illustrates the boot path 200 of a computer according to one embodiment of the present invention. The boot path 200 includes the CPU 105, a chipset 210, a Universal Serial Bus (USB) controller 220, a USB device having BIOS instructions 215, and the BIOS EPROM 125. The USB controller 220 is a bus master device that can be incorporated within the chipset 210 or may be separate from the chipset 210. The USB controller 220 may follow the USB protocol, or may use a different protocol if desired.

When the computer is powered on, the USB controller 220 checks the USB port of the computer to determine if any connected USB device contains the BIOS instructions. If the USB device 215 includes BIOS instructions, these instructions are passed via the USB controller 220 through the chipset 210 to the CPU 105. The CPU 105 can then execute the instructions to boot the computer. Of course, the instructions on the USB port may be used to program the BIOS EPROM 125 in a manner known to one of skill in the art.

If none of the devices connected to the USB port include BIOS instructions, the USB controller may instruct the computer to cycle forward to the BIOS EPROM 125. If the BIOS EPROM 124 is present and not corrupted, the CPU 105 executes the instructions in the BIOS EPROM 125 to boot the computer.

Figure 3:
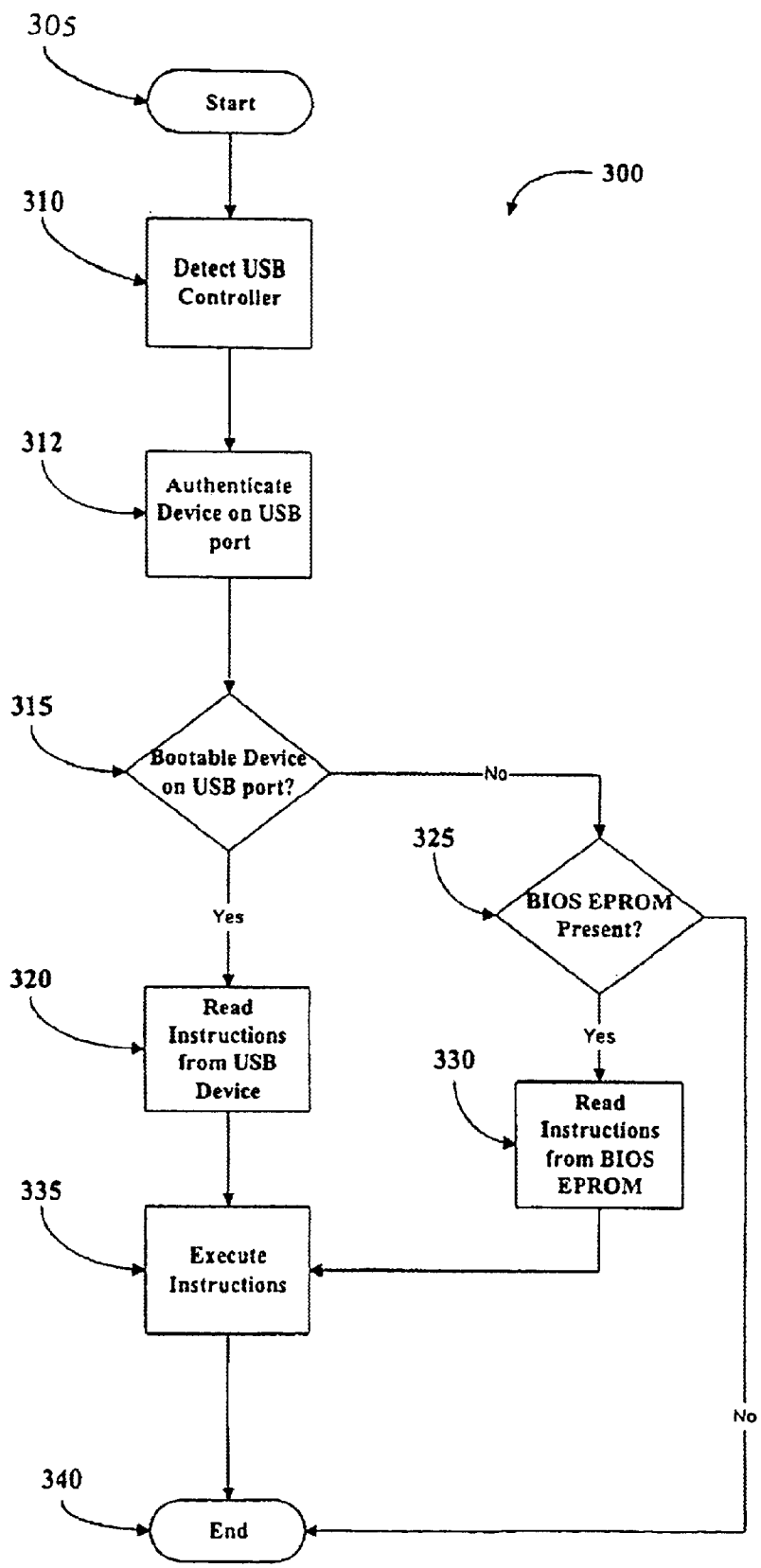
FIG. 3 is a flowchart showing the boot process used by a computer according to one embodiment of the present invention.

The boot process 300 used by a computer according to an embodiment of the present invention is shown in FIG. 3. The process begins in a start state 305. Proceeding to state 310, the computer detects whether a USB controller is present. If no USB controller is present, the computer does not attempt the boot process 300, but proceeds with a normal boot process using the BIOS EPROM.

Proceeding to state 312, the computer attempts to authenticate any device connected to the USB port. A bootable device on the USB is capable of reprogramming the BIOS EPROM 125. The authentication procedure ensures that only an authorized device is used. Techniques to accomplish the authentication process are well known in the art, and may include reading a code from the device connected to the USB port, or a challenge and reply system. If the device is not authorized, the computer will not boot using the instruction on the USB device. If the device passed the authentication, the process 300 continues to attempt to boot the computer.

Proceeding to state 315, the USB controller determines whether any of the devices attached to the USB port is a bootable device containing BIOS instructions. The USB port is capable of interfacing many devices to the computer. At startup, the USB controller is only interested in devices that include boot instructions for the computer. If a bootable device is connected to the USB port, the process 300 proceeds along the YES branch to state 320. In state 320, the process 300 reads the boot instructions from the bootable USB device. The instructions are read through the USB port via the USB controller.

Returning to state 315, if no bootable device exists on the USB port, the process 300 proceeds along the NO branch to state 325. In state 325, the computer determines if a BIOS EPROM is present and non-corrupt. If the BIOS EPROM is corrupted, the computer treats it as if no BIOS EPROM is present. If no BIOS EPROM is present, the process 300 proceeds along the NO branch to an END state 340. In this situation, the computer is unable to boot due to the lack of BIOS instructions available on either the USB port or the BIOS EPROM.

Returning to state 325, if the BIOS EPROM is present, the process 300 proceeds along the YES branch to state 330. In state 330, the initial boot instructions are read into the CPU from the BIOS EPROM.

After the initial boot instructions are read from either the USB port in state 320 or the BIOS EPROM in state 330, the process 300 proceeds to state 335. In state 335, the CPU 105 executes the initial instructions necessary to boot the computer. After the instructions are executed, the computer will boot-up and the boot process 300 terminates in end state 340.

In an alternative embodiment, the CPU 105 may be preset to either boot from either the USB port or the BIOS EPROM 125. The CPU 105 may contain an indicator such as a policy bit that directs the CPU 105 to a desired boot path. For example, if the policy bit was set to a logical high, the CPU 105 may boot through the USB port. However, if the policy bit was set to a logical low, the CPU 105 may boot through the BIOS EPROM 125. The use of a boot indicator directs the CPU 105 to a specific boot path regardless of whether a bootable device is connected to the USB port.

Numerous variations and modifications of the invention will become readily apparent to those skilled in the art. Accordingly, the invention may be embodied in other specific forms without departing from its spirit or essential characteristics.

What is claimed is:

1. A method comprising:

determining whether a bootable device is connected to a USB port of a computer;

reading initial boot instructions from the bootable device if present; and reading the initial boot instructions from a computer BIOS if the bootable device is not present.

2. The method of claim 1, further comprising interfacing the USE port to the computer with a USB controller.

3. The method of claim 2, further comprising operating the USB controller under the USB protocol.

4. The method of claim 2, further comprising setting the USB controller as a bus master.

5. The method of claim 1, further comprising executing the boot instruction with a processor.

6. The method of claim 1, further comprising determining if the computer BIOS is corrupted.

7. The method of claim 6, further comprising stopping the boot process if the computer BIOS is corrupted.

8. A method comprising:

determining a bootable device on a USB port;

authenticating the bootable device on the USB port; and transferring boot instructions from the bootable device if the bootable device is authenticated.

9. The method of claim 8, further comprising interfacing the USB port to the computer with a USB controller connecting to a BIOS if the bootable device is not present or not authenticated; and reading boot instructions from the BIOS.

10. The method of claim 8, further comprising using said bootable device to program instructions into the BIOS.

11. The method of claim 8, further comprising executing the boot instruction with a processor.

12. The method of claim 11, further comprising storing the BIOS in an EPROM.

13. A computer comprising:

a processor which reads instructions;

a USB controller connected to a USB port, the USB controller checking the USB port to determine if a device containing initial boot instructions is connected to the USB port, the processor automatically reading the boot instructions from the device if the device is present.

14. The computer of claim 13, further comprising a BIOS EPROM containing initial boot instructions, wherein the boot instructions are read by the processor if the USB device containing boot instructions is not present.

15. The computer of claim 13, further comprising authenticating the USB controller prior to reading said boot instructions.

16. A program storage device readable by a machine comprising instructions that cause the machine to:

scan a USB port for a bootable device;

transfer initial boot instructions from the bootable device if the bootable device is present;

connect to a BIOS if the bootable device is not present; and read initial boot instructions from the BIOS.

17. The program storage device of claim 16, wherein the instructions further causes the machine to determine if the BIOS is corrupted.

18. A method comprising:

checking a BIOS for boot instructions;

reading the initial boot instructions from the BIOS if present; and reading the initial boot instructions from a bootable device connected to a USB port if not present on the BIOS; and programming the bios using said bootable device if said BIOS is empty.

19. The method of claim 18, further comprising determining if the BIOS is empty.

* * * * *